US007802126B2

(12) United States Patent
Johnson

(10) Patent No.: US 7,802,126 B2
(45) Date of Patent: Sep. 21, 2010

(54) DATA CENTER VIRTUAL TAPE OFF-SITE DISASTER RECOVERY PLANNING AND IMPLEMENTATION SYSTEM

(76) Inventor: R. Brent Johnson, Kappelistrasse 6, Zurich (CH) 8002

( * ) Notice: Subject to any disclaimer, the term of this patent is extended or adjusted under 35 U.S.C. 154(b) by 79 days.

(21) Appl. No.: 12/024,777

(22) Filed: Feb. 1, 2008

(65) Prior Publication Data
US 2008/0148097 A1    Jun. 19, 2008

Related U.S. Application Data

(62) Division of application No. 11/006,020, filed on Dec. 6, 2004.

(51) Int. Cl.
*G06F 11/00*    (2006.01)
(52) U.S. Cl. .................. 714/1; 714/2; 714/6; 703/25
(58) Field of Classification Search ............. 703/25
See application file for complete search history.

(56) References Cited

U.S. PATENT DOCUMENTS

| 6,578,146 | B2 | 6/2003 | Johnson | |
| 6,732,294 | B2* | 5/2004 | Mackrory et al. | 714/25 |
| 6,766,520 | B1* | 7/2004 | Rieschl et al. | 719/321 |
| 7,139,885 | B2* | 11/2006 | Yamagami | 711/162 |
| 7,200,546 | B1* | 4/2007 | Nourmohamadian et al. | 703/24 |
| 2003/0120676 | A1* | 6/2003 | Holavanahalli et al. | 707/102 |
| 2003/0126389 | A1* | 7/2003 | Mackrory et al. | 711/162 |
| 2004/0006702 | A1 | 1/2004 | Johnson | |
| 2004/0034811 | A1 | 2/2004 | Trimmer et al. | |
| 2004/0148458 | A1 | 7/2004 | Sekine et al. | |
| 2004/0153614 | A1* | 8/2004 | Bitner et al. | 711/162 |

* cited by examiner

*Primary Examiner*—Yolanda L Wilson
(74) *Attorney, Agent, or Firm*—Head, Johnson & Kachigian, P.C.

(57) ABSTRACT

A system for planning and verifying off-site disaster recovery plans as well as implementing alternate fall back operations in the event of a disaster. The system includes at least one primary mainframe computer having an inboard catalog component, a primary emulated device controller connected to the primary computer, and a primary virtual tape system connected to the primary computer. A primary virtual tape system catalog is connected to the primary virtual tape system. A disaster recovery administrator using remote management tools maintains user and resource profiles and controls configuration of the primary emulated device controller and the primary virtual tape system. A disaster recovery facility includes at least one customer virtual tape system including a virtual tape system catalog component, a terminal emulator in communication with a disaster recovery mainframe computer and a disaster recovery virtual tape system having a virtual tape system catalog in communication with the disaster recovery mainframe wherein customer virtual tape system images are mirrored on the disaster recovery virtual tape system and catalog information from the customer virtual tape catalog is mirrored on the disaster recovery tape system of the disaster recovery facility.

6 Claims, 1 Drawing Sheet ent from the data center for reuse.

DATA CENTER VIRTUAL TAPE OFF-SITE DISASTER RECOVERY PLANNING AND IMPLEMENTATION SYSTEM

RELATED APPLICATION

This application is a divisional of U.S. patent application Ser. No. 11/006,020 that was filed on Dec. 6, 2004.

BACKGROUND OF THE INVENTION

1. Field of the Invention

The present invention relates to a method, process and system to plan for disaster recovery, to test disaster recovery plans, and to implement fall back or alternate operations in the event of a disaster at a computer facility.

2. Prior Art

The issue of disaster recovery for data center computer operations is increasingly important. Increasing amounts of time, effort and money are being spent not only on planning for the possibility of implementing disaster recovery but for periodic testing to assure that disaster recovery facilities are available.

Large mainframe computer operations typically have multiple mainframes with a variety of applications which are subject to periodic, interval backups. Not only do these large mainframe computer operations maintain off-site data storage, but independent, third-party businesses have arisen which act to not only store data off-site but act as data recovery facilities in the event of a disaster at the primary facility. In the event of a disaster, the third party operator attempts to duplicate the hardware, applications and processes.

For the past 20 to 30 years, cartridge tape units have been utilized at mainframe computer installations in order to store and backup data. To handle multiple tape cartridges, tape silos have been developed which include a robotic arm and a shelf or shelves of tapes. The silo can automatically load tapes into a tape drive. For cataloging and indexing functions, and to facilitate data accessibility, typically one data set is placed on one tape volume. Some tape data sets span multiple volumes where others occupy less than a single volume which can result in a waste of tape as most data sets occupy only small portion of the media and the rest of the volume remains unused.

In many instances, tapes containing backup data are physically transported to an off-site storage location on a scheduled basis, stored until that data passes an expiration date then returned to the data center for reuse.

In the event of a disaster at the primary mainframe location, the off-site tape cartridges may be utilized to the extent they have the data stored thereon. In order for a remote location to run a primary site's system, various configuration data and information must be loaded and programmed on the computer at the disaster recovery facility. For example, IOCP (input/output control program) data must be loaded at the disaster recovery facility.

A number of attempts have been made in the past to incorporate an emulation device or emulator with a cartridge tape device. In one arrangement, an emulation device is interposed between a primary and a physical tape library which may be operated by a mechanical device such as a tape silo which physically picks a tape or tapes. Information from the tape is emulated but the data images themselves are stored exclusively on the physical tapes. Additionally, there is no central catalog of images, only a catalog maintained by each emulator. Moreover, the primary mainframe must retrieve an image or images so that disaster recovery is not facilitated without operation of the mainframe.

In another prior attempt to utilize a tape emulator, a virtual tape controller has been added to the above-described emulator. Again, none of these arrangements have an independent or outboard cataloging feature so that cataloging of the images may be done without intervention of or operation of the mainframe.

There remains a need to provide a system to verify and test off-site disaster recovery plans for a mainframe computer installation.

There also remains a need to provide a system which can facilitate rapid and simple operation of a backup computer facility in the event of a disaster at the primary computer installation.

There also remains a need to provide a disaster recovery planning and implementation system wherein no tapes need to be physically transported from the primary computer facility.

SUMMARY OF THE INVENTION

The present invention is directed to a method and process for a virtual tape off-site disaster recovery planning and implementation system.

A primary mainframe computer may execute a variety of operating systems and often includes an inboard software component that tracks the data written on to tapes. The information repository maintained by that tape management software is generally referred to as a tape catalog. An emulated device controller provides a communication controller that connects various peripherals to the primary mainframe and manages transmission of information between the primary mainframe and peripherals. The emulated device controller is connected to the primary mainframe via channel connection and an adaptor. The emulated device controller is, in turn, connected to a communications network, such as the Internet.

A primary virtual tape system (hereinafter VTS) is connected to the primary mainframe via a channel connection. The virtual tape system maintains a plurality of virtual tape images through virtual drives that are indistinguishable from real tape drives. These virtual tape images may be encrypted using a central key phrase specified by a security administrator.

Information within the VTS catalog may be controlled by a user that connects into the VTS as an administrator. Information on the primary mainframe inboard tape catalog is periodically provided to the virtual tape system catalog.

A remote security administrator may interactively communicate with the emulated device terminal and with the virtual tape system.

An independent disaster recovery facility will typically and desirably be remote from the primary mainframe and will include one or more remote data storage client devices. The remote data storage client devices are primarily responsible for collecting virtual tape images from the primary virtual tape system. The remote data storage client devices serve as an off-site repository to back up tape images. Operating with or within each of the remote data storage client devices would be a VTS catalog similar to the primary VTS catalog.

Tape images controlled by the remote data storage client device may be stored in a large disk array or other storage mechanism at the disaster recovery facility.

In addition to the remote data storage client devices and catalog, the disaster recovery facility includes the remaining components for a VTS including an emulated tape controller. It also includes an emulated console controller.

The virtual tape system (VTS) catalog is a repository of tape related information that is used to manage the disposition of its tapes and is much like the mainframes tape catalog 14 within the primary mainframe.

As described in detail herein, the foregoing arrangement permits planning for a disaster, periodic testing of disaster recovery plans, and implementation of back-up operations in the event of a disaster.

DETAILED DESCRIPTION OF THE PREFERRED EMBODIMENTS

Figure 1:
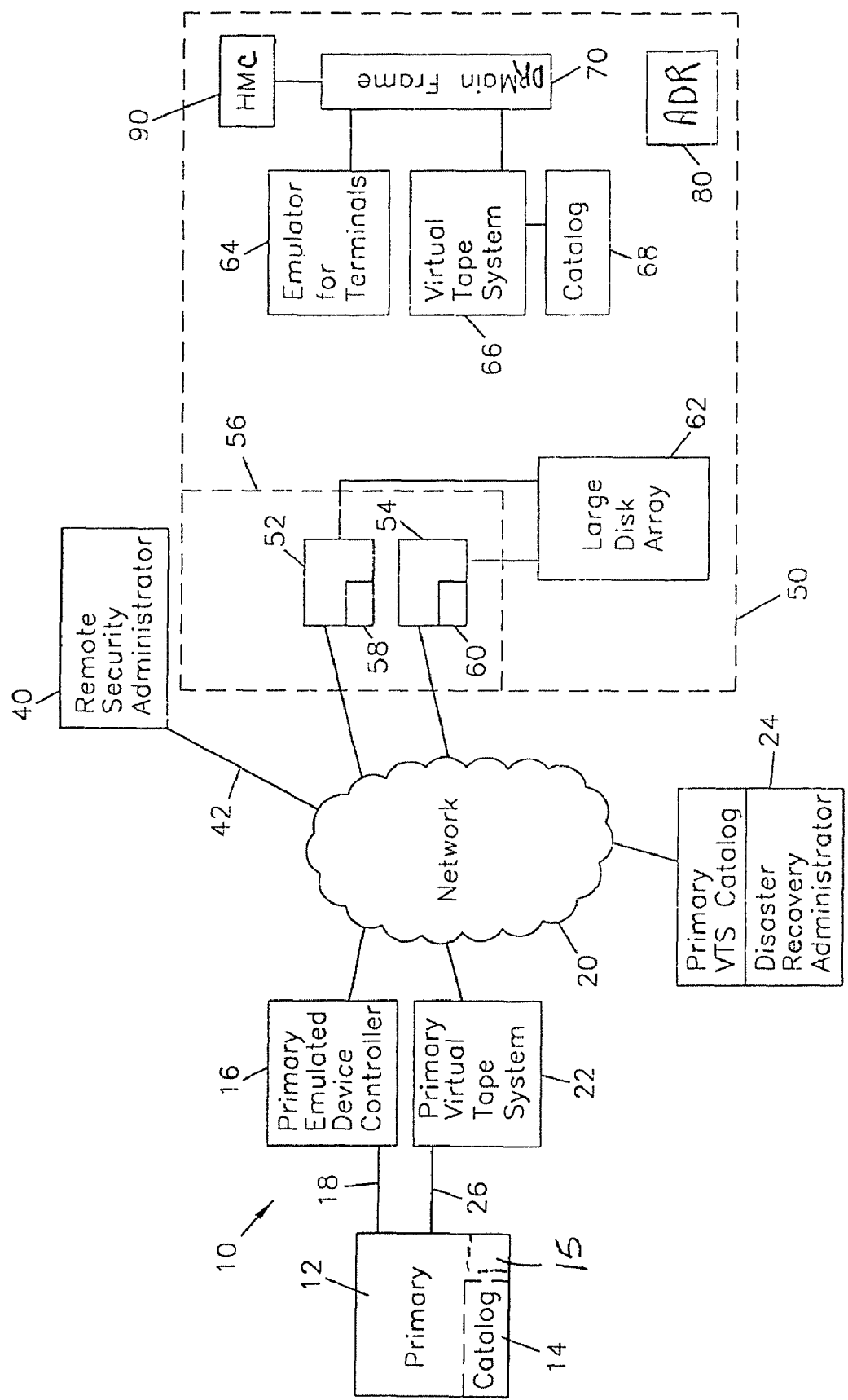
FIG. 1 is a simplified schematic diagram of a preferred embodiment of a system constructed according to the present invention.

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

FIG. 1 illustrates a simplified schematic diagram of a virtual tape off-site disaster recovery planning and implementation system 10 constructed in accordance with the present invention.

A primary mainframe computer 12 may be executing various operating systems such as MVS, VM, VSC, Linux or Unix, among others. While the primary mainframe 12 most often refers to a mainframe, it will be understood that it is not so limited. The primary mainframe computer 12 may also include a primary inboard software component in the form of a tape catalog as shown by dashed lines 14. The catalog includes inboard tape catalog information as previously described.

The primary mainframe 12 may have storage divided into logical partitions (LPAR). Each LPAR can have its own operating system and can be initialized or shut down independently of other LPARs on the same mainframe.

It will be understood that a data center may have multiple mainframes although a single mainframe 12 is shown in FIG. 1.

The present invention also includes a primary emulated device controller 16 which provides a communications controller that connects various peripherals to a primary mainframe and manages transmission of information between the primary mainframe 12 and peripherals. The emulated device controller 16 is connected to the primary mainframe 12 by a channel connection 18.

The emulated input/output device controller 16 may be supported by an encrypted communications protocol. The emulated device controller 16 includes a device driver to communicate directly with one or more hardware components attached to one or more computer systems such as, but not limited to, mainframe computers. The device driver controls the hardware in a manner prescribed by its design, causing it to interact with the other computer systems as if it were one or more device types. A lower level driver additionally acts as a conduit to a higher level server component that governs the overall behavior of the emulated devices. This higher level component primarily supplies the driver with new data to provide through the emulated devices to the other computers to which it is connected and accepts data arriving to the emulated devices carried up by the device driver.

One type of terminal emulator is disclosed in Applicant's U.S. Pat. No. 6,578,146 entitled "System, Method and Article of Manufacture to Remotely Configure and Utilize an Emulated Device Controller Via Encrypted Validation Communication Protocol", which is incorporated herein in its entirety by reference.

The emulated device controller 16 is connected to the primary mainframe via channel connection 18 and an adaptor, such as but not limited to, various ESCON adaptors, parallel channel adaptors, FICON adaptors and SCSI adaptors.

The emulated device controller 16 is connected to a communications network 20, such as, but not limited to, the Internet or other computer network.

A primary virtual tape system 22 is connected to the primary mainframe 12 via a channel connection 26. The virtual tape system may include an adaptor card for transfer of data with the primary mainframe. Illustrative, non-limited examples of such adaptors would include various ESCON adaptors, parallel channel adaptors, FICON adaptors, and SCSI adaptors.

Also shown in FIG. 1 is a VTS catalog as well as a disaster recovery administrator 24. The virtual tape system (VTS) catalog is a repository of tape related information maintained on a secured server that is used to manage the disposition of its tapes and is much like the mainframes tape catalog 14 within the primary mainframe. The VTS catalog is connected to the primary virtual tape system 22 and primary mainframe 12 through network 20. In fact, information on the mainframe tape catalog is periodically provided to the VTS 22 so that it might update the VTS catalog 24. Specifically, each time a tape image is created, information on that tape image is placed in the VTS catalog. The VTS catalog 24 is transparent to the primary mainframe 12. Each time a tape image is moved to archive, that information is placed in the VTS catalog.

The VTS 22 includes a host module 15 that is installed and executes upon, or "inboard", the mainframe computer 12. The purpose of the inboard component is to transmit the information to the VTS, accomplished by it allocating one of the VTS's emulated devices and communicating through it in order to transfer such things as the scratch list and vault list, both retrieved from the mainframe's tape catalog.

Additionally, tape mount messages that indicate the tape volume serial number to be mounted upon a particular drive are also transferred through this interface. The interface may be accomplished through either of two mechanisms. First, it may be implemented by way of unique commands to a VTS emulated tape driver that are otherwise unused during the normal use of tape operations. When these unique commands are received, they are inspected for validity and their contents retrieved. Second, it may be implemented by way of the normal transfer of data to another emulated device type, such as a 3286 printer or a 3270 display. These latter approaches require that the normal device data streams be parsed as necessary in order to extract the desired information from them.

The receipt of the tape scratch list causes the VTS catalog 24 to be updated to reflect which tapes are considered scratch candidates while the receipt of the vault list causes the VTS catalog to be updated to reflect which tapes are to be transmitted to the off-site data storage component.

In addition to the information in the VTS catalog 24 that is modified by the inboard host module 15, the transmission of tapes from the emulated device unit to off-site data storage components, to be described herein, and vice-versa, is reflected in the VTS catalog 24. Therefore, all of the information regarding a specific tape is retained in the VTS catalog.

Finally, information within the VTS catalog may be controlled by a user that connects into the VTS as an administrator. For example, a disaster recovery administrator may perform various tasks such as instructing that a particular tape image be recovered from the off-site data storage facility as instructed from time to time.

One form of virtual tape system contemplated by the present invention is illustrated in Applicant's pending patent application Ser. No. 10/457,133 entitled "System and Method for Virtual Tape Management With Remote Archival and Retrieval Via an Encrypted Validation Communication Protocol" which is incorporated herein by reference.

FIG. 1 also discloses a remote security administrator 40 which interactively communicates with the emulated device controller 16 and the virtual tape system 22 via communication line 42 through the network 20. The security administrator 40 administers and maintains user and resource profiles and further communicates with information via remote configuration software. The remote security administrator 40 controls the configuration of one or more of the emulated device controllers 16 or the virtual tape systems 22 and also controls access to remote off-site backup systems to be described herein.

Box formed by dashed lines 50 illustrates a disaster recovery facility which may be managed by the primary mainframe operation 12 or may be an independent, third-party operation. The disaster recovery facility 50 will typically and desirably be remote from the primary mainframe 12 so that in the event of a disaster, the disaster recovery facility can take over and operate the computer operations of the primary mainframe independently. Although a single mainframe is shown in FIG. 1, it will be understood that the disaster recovery facility may manage multiple mainframes of multiple entities.

The disaster recovery facility 50 will include one or more remote data storage client devices, such as remote data client storage devices 52 and 54.

The remote data client storage devices are primarily responsible for collecting virtual tape images from the primary virtual tape system 22. The remote data storage client devices serve as an off-site repository to back-up tape images. Once the virtual tape system 22 has connected with the remote data storage client device 52 or 54, software operating within the VTS 22 encrypts data to be transmitted to the remote data storage device according to a generated encryption key. Once a virtual tape has been copied or moved, the VTS catalog 24 is updated to reflect the virtual tape's location and the time that it was copied. The security administrator 40 specifies those volumes and directories and/or files to be backed up, the frequency and time of day at which specific files are to be backed up, an encryption key or keys for the backup data set, and the identification of the particular storage CPU desiring to be used.

A separate remote data storage client device 52 or 54 may be designated for each mainframe computer facility being serviced by the disaster recovery facility 50. For example, the disaster recovery facility 50 may act as a back-up for different mainframe computer operations. In some instances, the remote data storage client device 52 or 54 may actually be owned by the primary computer owner rather than the disaster recovery facility. Accordingly, these are shown by the sub-box 56 within disaster recovery facility 50.

Operating with or within each of the remote data storage client devices 52 and 54 would be a VTS catalog, 58 and 60, respectively. Each of these catalogs will operate similar to the primary VTS catalog 24 but will operate as and be a secondary catalog in normal operation.

Tape images in the remote data storage client devices 52 and 54 may be stored in a large disk array 62 or other storage mechanism at the disaster recovery facility 50.

The disaster recovery facility 50 includes a disaster recovery terminal emulator 64 similar to the primary emulated device controller 16 described in relation to the primary mainframe.

The disaster recovery facility 50 also includes a virtual tape system 66 similar to the virtual tape system 22 operating with the primary mainframe 12. The virtual tape system 66 also includes VTS catalog 68 similar to VTS catalog 24. Finally, the disaster recovery facility 50 would include its own mainframe, such as mainframe 70, in communication with both the disaster recovery terminal emulator 64 and the virtual tape system 66.

The present invention will be described with respect to at least two processes or operations. The first is the on-going operation of the disaster recovery facility 50 in order to prepare for a disaster and to periodically test the facility 50 in preparation for any disaster. The second operation is to be used as a fall back or fail over facility in the event that a disaster has occurred at the primary mainframe computer operation 12.

In the periodic operation of the disaster recovery facility, a number of steps will be taken. Catalog information from the primary 12 mainframe taken from the VTS catalog 24 will be mirrored or duplicated on the disaster recovery facility VTS catalog 58 or 60. A further step is that tape images from the primary 12 virtual tape system 22 will be periodically transferred or copied to the disaster recovery facility remote data storage client device 52 or 54.

Optionally, the tape images on the remote data storage client device 52 or 54 may be stored on a large disk array 62 of the disaster recovery facility 50. Finally, the disaster recovery administrator 24 can utilize remote management tools to test and verify various disaster recovery plans.

In the event of a disaster at the primary mainframe 12, the disaster recovery facility must quickly react and operate to take over ongoing computer operations from the primary facility. Initially, a copy of the VTS catalog 58 will be copied to the VTS catalog 68 at the disaster recovery facility.

The emulated device controller 16 at the primary computer 12 has certain configuration information regarding its hardware and applications. The emulator for terminals 64 at the disaster recovery facility 50 must be reconfigured for fall back operation. This may be done in a number of ways. The configuration information from the primary emulated device controller 16 may be periodically dumped to a storage medium, such as a DVD or CD, and periodically stored at the disaster recovery facility. Alternatively, configuration information may be periodically stored on a tape and then recalled.

The disaster recovery terminal emulator 64 is then reconfigured using the configuration information of the primary mainframe 12.

Similarly, the virtual tape system 66 must be reconfigured using configuration information stored on media, such as a DVD or CD, or stored in the remote data storage client device 52 or 54. Thereafter, configuration information in the form of an input/output control program (IOCP) must be loaded onto the disaster recovery mainframe 70.

Thereafter, tape images can be reloaded from the remote data storage device 52 or the large disk array 62 in order to run the primary mainframe computer operations off-site at the data recovery facility 50. The virtual tape disaster recovery catalog 68 operates as the primary repository of catalog information with the catalog 58 operating as a secondary information catalog.

The Remote Security Administrator 40 may transfer additional non-tape information of value during recovery from a disaster to an Arbitrary Data Repository 80. This data includes such things as disaster recover checklist, operations procedure manuals, electronic message and reference guides, I/O configuration information (IOCP data) and networking topology documentation. The Arbitrary Data Repository 80 is accessed as required by the Remote Security Administrator 40 following a disaster in order to retrieve and use the information previously stored onto it. It effectively serves as a knowledge base repository for the disaster recovery personnel to utilize during their tests and in the event of a true disaster.

The facilities of the invention provide the Remote Security Administrator 40 the ability to control the disaster recovery site without having to be physically present at that site. The use of a common web browser, such as might be available at any hotel business center, is sufficient to access and operate the invention in a secure manner using Secure Socket Layer (SSL) encryption. Once connected to the invention, the Remote Security Administrator 40 is prompted for his user ID and password so that his access request might be authenticated and control over the invention allowed. Once connected, the Remote Security Administrator 40 may perform the following tasks:

1. Accessing and printing, as necessary, the information stored on the Arbitrary Data Repository 80 previously stored to the disaster recovery site.
2. Connecting to the VTS catalog 68 in the disaster recovery site in order to associate the remote data storage units 52 and 54, tape emulator component(s) 66 and VTS catalog 58 and 60 to one another to form a complete VTS similar to what was in place at the customer's original data center. This can be envisioned as 'flipping the switch' and activating the connections between the disaster recovery VTS components for that particular customer.
3. The option to sever any existing connection between the remote data storage units 52 and 54 and the original customer data center. In the event the disaster recovery is being used because of a true disaster this connection would likely already have become unexpectedly severed. However, it should be considered that during a disaster recovery test that the remote storage data units may continue to be accessed, if desired, for continuing backup operations from a functioning customer data center.
4. Accessing an existing mainframe system 70 at the disaster recovery site via the emulated console controller 64 in order to perform any necessary pack restores using the emulated tape component 66 using the tape image sources within the large disk array 62 that are managed by the remote data storage units 52 and 54. System packs and system catalogs would be restored as necessary to initial program load the system.
5. Accessing the Hardware Management Console 90 to initiate an initial program load of the mainframe.
6. Activating and operating the restored instance of the customer's system through use of a terminal emulation by way of the console controller 64. Due to having associated the elements of the VTS system at the disaster recovery site, tape mounts are automatically satisfied as per normal VTS operation.

Once the problem or problems have been resolved, the primary mainframe 12 will return to normal operations.

The present invention permits implementation and testing of disaster recovery plans without physical movement of personnel and cartridge tapes.

Whereas, the present invention has been described in relation to the drawings attached hereto, it should be understood that other and further modifications, apart from those shown or suggested herein, may be made within the spirit and scope of this invention.

The invention claimed is:

1. A system for planning and verifying off-site disaster recovery, which system comprises: at least one primary mainframe computer having an inboard catalog component, a primary emulated device controller connected to said primary computer, and a primary virtual tape system connected to said primary, computer; a primary virtual tape system catalog connected to said primary virtual tape system; a disaster recovery facility being remote from said primary mainframe computer, said disaster recovery facility comprising at least one customer virtual tape system having a virtual tape system catalog component, at least one remote data storage client device having at least one virtual tape catalog, a disaster recovery terminal emulator in communication with a disaster recovery mainframe which is reconfigured with configuration information from said primary emulated device controller, a disaster recovery virtual tape system having a virtual tape system catalog in communication with the disaster recovery mainframe and the disaster recovery terminal emulator, and an arbitrary data repository having non-tape disaster information; wherein the primary virtual tape system catalog is mirrored on the virtual tape catalog of the remote data storage client device; wherein primary virtual tape system images are mirrored on the disaster recovery virtual tape system, and catalog information from the customer virtual tape catalog is mirrored on the disaster recovery virtual tape system of the disaster recovery facility; and a disaster recovery administrator using remote management tools to maintain user and resource profiles, control configuration of the primary emulated device controller and the primary virtual tape system, and test and verify various disaster recovery plans.

2. A system as set forth in claim 1 wherein said at least one primary mainframe computer includes multiple primary mainframe computers, each having an inboard catalog component, a primary terminal emulator and a primary virtual tape system.

3. A system as set forth in claim 1 including one said customer virtual tape system for each said mainframe.

4. A system as set forth in claim 1 wherein the remote data storage client device having the virtual tape catalog is in communication with a data storage array.

5. A system as set forth in claim 1 wherein the non-tape disaster information of the arbitrary data repository includes a disaster recovery checklist, operations procedure manuals, electronic message and reference guides, I/O configuration information, and network topography documentation.

6. A process to implement alternate operations at a disaster recovery facility in the event of a disaster at a primary mainframe computer having a primary emulated device controller and a primary virtual tape system wherein tape catalog information from said primary mainframe computer is stored on a primary virtual tape system catalog device, which process comprises: periodically mirroring or duplicating the tape catalog information from said primary mainframe computer to a remote data storage client device having a disaster recovery virtual tape system catalog at a disaster recovery facility; periodically transferring or copying tape images from said primary virtual tape system catalog device to the remote data storage client device at said disaster recovery facility; copying the disaster recovery virtual tape system catalog of the remote data storage client device to a disaster recovery virtual tape system having a virtual tape system catalog at said disaster recovery facility; remotely reconfiguring a disaster recovery terminal emulator at said disaster recovery facility with configuration information from said primary emulated device controller; remotely reconfiguring a virtual tape system at said disaster recovery facility using configuration information from said primary virtual tape system; remotely loading a disaster recovery mainframe at said disaster recovery facility with an input/output control program; and loading said tape images stored on said remote data storage client device to said disaster recovery virtual tape system at said disaster recovery facility using said remote management tools.

* * * * *